United States Patent [19]

Parker et al.

[11] Patent Number: 4,727,501
[45] Date of Patent: Feb. 23, 1988

[54] METHOD OF SIMULATING TIRE TREAD NOISE AND APPARATUS

[75] Inventors: David H. Parker, Brecksville; David G. Caruso, Cuyahoga Falls; Donald B. Thrasher, Brecksville; Robert J. Blinn, North Canton, all of Ohio

[73] Assignee: The Uniroyal Goodrich Tire Company, Akron, Ohio

[21] Appl. No.: 19,910

[22] Filed: Feb. 27, 1987

[51] Int. Cl.$^4$ .............................................. B60C 11/10
[52] U.S. Cl. ..................................... 364/574; 364/576; 152/209 R
[58] Field of Search .............................. 364/574, 576; 152/209 R, 209 D

[56] References Cited

U.S. PATENT DOCUMENTS

| | | | |
|---|---|---|---|
| 3,926,238 | 12/1975 | Vorih | 152/209 R |
| 4,327,792 | 5/1982 | Landers | 152/209 R |
| 4,442,499 | 4/1984 | Sekula et al. | 364/574 |
| 4,598,748 | 7/1986 | Campos et al. | 152/209 R |

OTHER PUBLICATIONS

John H. Vorterasian, *Quieting Noise Mathematically-Its Application to Snow Tires*, Society of Automotive Engineers, Paper No. 690520, May 19, 1969.
William J. Vorin, *Designing Quiet Tread Spacings for Tires*, presented at the 99th "Rubber Division" Meeting, Americal Chemical Society, Spring, 1971.

*Primary Examiner*—Tom Wyse
*Attorney, Agent, or Firm*—John D. Haney; Alfred D. Lobo

[57] ABSTRACT

A method is disclosed for evaluating the level of objectionable noise associated with the operation of a tire by virtue of its tread contacting a road surface, which comprises digitizing the tread design on a coordinate system so as to define load-supporting portions of the tread in contact with the pavement, and distinguish them in binary form from those portions of the tread which are not in contact, as multiple matrix elements; defining a generally arcuate profile of a leading or trailing edge of a footprint of the tread by fitting an equation to the edge; sequentially performing the time ensemble summation, of the noise produced by each matrix element, over every matrix element on the entire circumferential surface; converting the sequence of summations to a periodic analog signal; converting the analog signal to a sound; and, aurally evaluating the sound. In a simplified case 0's and 1's along at least one footprint edge are sequentially summed around the circumference of the tire. The system requires only a means for digitizing the tread pattern, a computer to perform the necessary manipulations of data, and a means to convert a digital signal to an analog signal.

6 Claims, 3 Drawing Figures

METHOD OF SIMULATING TIRE TREAD NOISE AND APPARATUS

BACKGROUND OF THE INVENTION

This invention relates to the evaluation of noise generated by a tire's tread as it travels upon a road surface. Tire noise is commonly experienced as sound with a varying level of acceptability. A tire manufacturer seeks to design a tire tread which not only fulfills its function relating to wear, wet and dry traction, rolling resistance, and other desirable properties, but also runs with an acceptably low noise level. Preferably the tire should run at an acceptable noise level through the entire operating range of a particular vehicle on which the tire is to be mounted.

Since noise is inherently subjective, due to the psychoacoustical effects involved, there is no known mathematical criteria to define noise. It is therefore necessary to subjectively evaluate a tire for noise acceptability. Historically, this has been done by hand cutting a set of tires or building a mold to produce a set of tires for evaluation. This process is expensive and time consuming, thus limiting the number of trials available to the design engineer to optimize the design.

Much energy has been devoted to designing a tire tread which will spread the noise spectrum generated by the running tire. For example, U.S. Pat. Nos. 4,327,792 and 4,474,223 teach how to spread the noise over a wide range of frequency to reduce the tonality and undesirability of the sound. John H. Varterasian described a Mechanical Frequency Modulation method in SAE 690520, Quieting Noise Mathematically—Its Application to Snow Tires, 1969. The problem is that, no matter what criteria are used to design the tread, there is no assurance that the result will be a tread with an acceptable noise level. Whether the noise is spread over a wide range of frequency, or dominated by one or a few frequencies, is of secondary importance if the noise level is unacceptable.

There is presently in use a tire-noise simulator at Technischer Überwachungs-Verein Bayern in Munich, West Germany, in which a scaled tread pattern is drawn on a band of paper, with the load supporting portions (lugs) shaded in black, and the grooves in white. The band is mounted on a rotatable drum having a fixed circumference. A light is shone on the pattern and reflected light is received by up to 40 photodetectors arranged side-by-side to extend across the width of the tread pattern. As is evident, this is a simple analog device to produce a pulse width modulated signal which may be correlated to the actual sound produced by the tread pattern. The pulse width is equal to the dwell time of the block as it traverses each detector or channel.

Among the limitations of such a device is that the model (pulse width signal) for the sound produced is fixed by the hardware and cannot easily be modified or fine-tuned. Also, the model is insensitive to speed changes since a change of speed simply dilates or contracts the period of the waveform.

Further, a new drawing must physically be made for each modification of block and channel configurations in modified tread designs. Still further, the size and sensitivity limitations of the photodetectors are exacerbated by the necessity of having to change their physical location to lie along the profile (edge) of a footprint, assuming such a refinement was desired over simply aligning the photodetectors across the width of the pattern.

It occurred to us that the foregoing limitations could be obviated if a noise evaluation could be predicated upon that generated by a design unit of a tread. Design unit refers to an arbitrarily chosen characteristic portion of the tread which is representative in general form, but with scale variations which cumulatively compose the tread. A preferred design unit is typically bounded by the circumferential centerline of the tread, a futhermost circumferential edge in contact with the road (contact edge), and predetermined lateral spaced apart boundaries.

No prior art has considered the use of a design unit as the only critical element necessary for making the aural evaluation with the help of appropriate software.

The device of our system, being purely digital, not only avoids the limitations of the prior art analog device but lends itself to being fine-tuned for a host of refinements to mimic the actual operation of the tread on a tire at varying speeds, loads, and inflation pressures on particular road surfaces. Under actual operation, each point on the tread's surface may not be independent of neighboring points. In other words, when a point is in contact with the road surface, there may be some, though slight, interaction with the points which are immediately precedent, also with the points on either side, and the points immediately subsequent. Further, the loading on a point near the center of the tread may not be the same as that on a point near an edge, nor would the contribution of each be the same based on their relative positions. It is such refinements which may be weighted into the construction of a sound waveform using our method. It lends itself to being tailored to provide the level of sophistication demanded of it.

The optimum test for evaluating the acceptability of the noise level of a tire is to mount a set of identical tires on a specific vehicle, and run it over a designated surface at various speeds, loads, and inflation pressures in the vehicle's operating range while a person within the vehicle listens to the sound generated by the tires. Of course, to do so, one must design the tread, construct green tires, build a mold to cure the green tires, and test the cured tires on the vehicle. This invention obviates the foregoing steps, yet arrives at a reliable evaluation.

The object of this invention is to exploit knowledge about the physics of tread pattern induced noise to synthesize an audio signal that is correlated to the noise produced by the actual tire. This allows the design engineer to screen a virtually unlimited number of variations of a basic design by editing tread designs, much like a word processor edits text. Since the noise generating mechanism is very complex, and not well understood, it is not expected that this invention will totally eliminate the need for actual testing.

SUMMARY OF THE INVENTION

It has been discovered that the actual running of a tire's tread on a road surface may be modeled on a computer. Since factual criteria for evaluation of the sound generated by a running tire are stored as information in the computer's storage, this information can be manipulated, at will, to make changes with the purpose of optimizing the tread design being modeled.

It is therefore a general object of this invention to model the actual test-running of a tire on a computer, and manipulate variables so as to optimize the design of the tread for the most acceptable noise level.

It is also a general object of this invention to eliminate the arbitrary choice of a usable tread, the cost of building molds, constructing and curing tires, and the time and effort involved in actually testing them; yet, to evaluate a multiplicity of tread designs for those with an acceptable noise level.

It is a more specific object of this invention to provide a highly economic method for evaluating a tread design for the noise level it generates, comprising, digitizing the tread's design on an appropriate coordinate system, digitizing each of plural selectedly pitched design units over the 360° circumference of the tread, so as to distinguish areas of contact between load supporting tread elements (or lugs) and spaces (or grooves) therebetween and define each in binary form, defining, with an algorithm, an arcuate profile of a leading and/or trailing edge of a footprint generated by said tread, summing the noise producing functions along said profile repetitively over the tread circumference to provide a multiplicity of summations, converting each summation to an analog signal correlatable in magnitude with said summation, converting each analog signal to a sound for evaluation of the noise level, and, aurally evaluating the sound to obtain an acceptable noise level.

BRIEF DESCRIPTION OF THE DRAWINGS

The foregoing and other objects and advantages of our invention will appear more fully from the following description, made in connection with the accompanying drawings of preferred embodiments of the invention, wherein like reference characters refer to the same or similar parts throughout the view and in which.

DETAILED DESCRIPTION OF PREFERRED EMBODIMENTS

Consider a tire tread geometry represented as a $m \times n$ matrix of points (typically 2048×200) with m rows around the circumference and n columns across the width of the tread. This matrix, which is generated from a shaded drawing by an optical scanner; an actual tire by a line scan camera; or other means; will be called the binary tread matrix, with elements b(i,j), where $$b(i,j) = \begin{cases} 1 \text{ tread element} \\ 0 \text{ space.} \end{cases} \quad (1)$$

Figure 1:
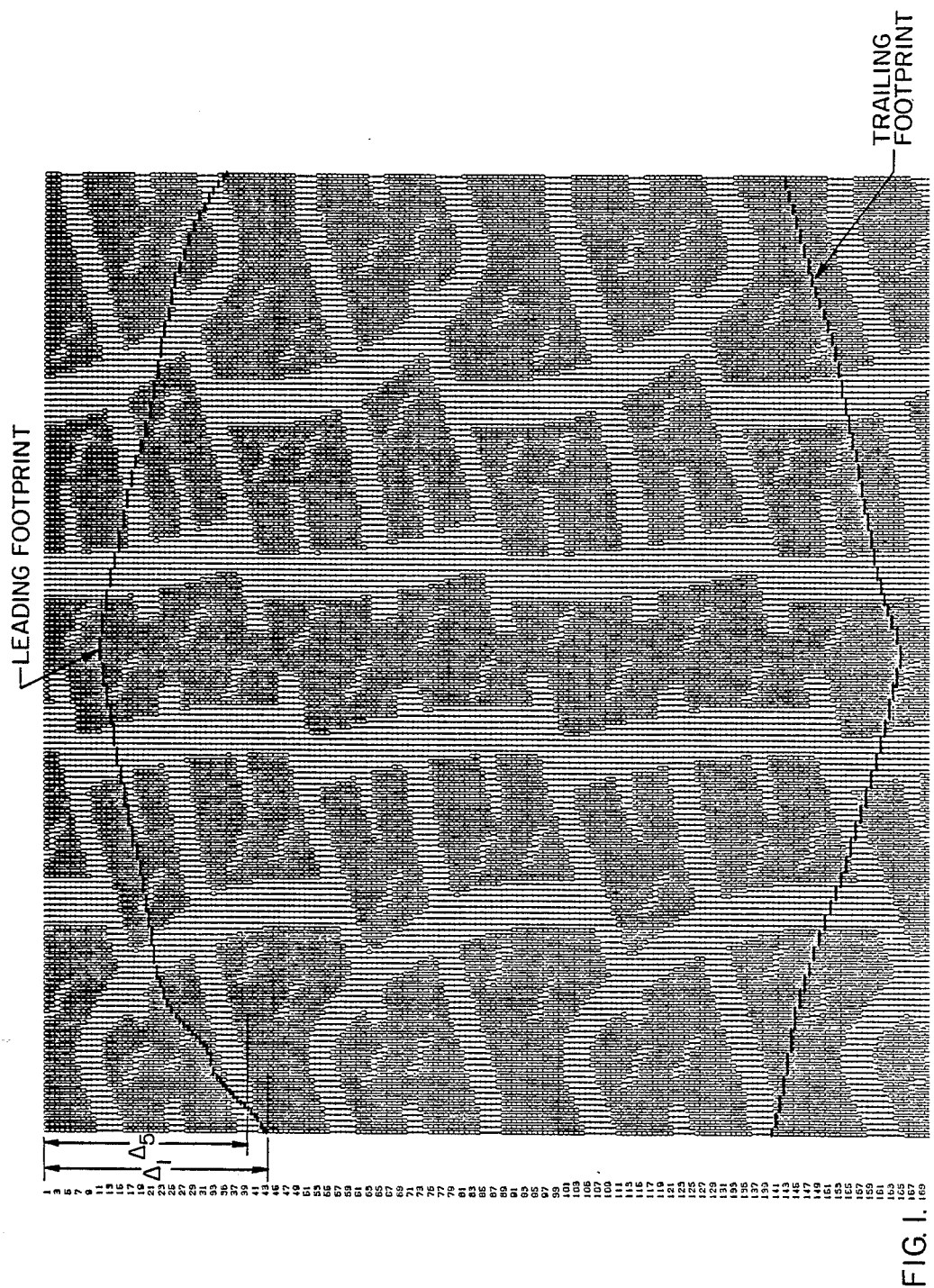
FIG. 1 is a scale representation of a tread pattern in binary form, showing a typical footprint.

An example of a binary tread matrix is shown in FIG. 1 wherein the leading and trailing edges of the footprint are provided by an approximation of an actual footprint of a similar design. Note that the b(i,j)'s have been complemented (1's and 0's reversed) to bear a closer visual resemblance to the actual tire.

It is assumed that the sound produced by the tread pattern is made up of a linear combination of the sounds produced by each matrix element. Let the sound produced by each element of the binary tread matrix be represented by a generalized periodic function $$g(i,j;t \pm T) = g(i,j;t) \quad (2)$$

$$1 \leq i \leq m$$

$$1 \leq j \leq n \quad (3)$$

where T is the period of the tire computed to correspond to a preselected linear velocity of the vehicle. We will assume that the q(i,j;t)'s are generated from the binary tread matrix by an operation which is denoted symbolically as $$g(i,j;t) = S\{b(i,j)\} \quad (4)$$

where S depends on the sound generation model being used. S may be a simple point operation, a group operation (such as convolution operations commonly used in image processing), or derived from experimental data. At this point, it is not necessary to know S, the m×n g(i,j;t)'s, or how they are obtained, since the intent is to construct a mathematical formalism for dealing with a linear combination of sound generators. The specifics of one model used to generate the g(i,j;t)'s will be discussed later.

It is assumed that the sound produced by each element of the tread matrix, g(i,j;t), is initiated or turned on by contact or departure with the road surface, i.e., the leading and trailing edges of the footprint outline. It is therefore necessary to sequence the turning on of the g(i,j;t)'s coincident with their entry or exit from the footprint. For simplicity, this discussion will be limited to the sound produced by the front of the footprint only—although unless specifically stated otherwise, it is understood that the sound produced by the rear of the footprint is similarly produced.

It is advantageous to construct the mathematical formalism in such a fashion as to separate the effect due to the sound generated by each element; and the effect due to the sequence, or pattern, of the elements. It will be assumed that the g(i,j;t)'s turn on at g(i,j;0). This requires a modification of g(i,j;t) to $g(i,j;t-\tau_{ij})$, where $\tau_{ij}$ is the time at which element i,j contacts the road or turns on. This allows one to generate a set of g(i,j;t) functions independent of where it is located in relation to the footprint (and thus when it will enter the footprint) and correct for where it is located by shifting the function in time by $\tau_{ij}$.

It is generally known, from the Fourier transform shifting theorem, that shifting a function in the time domain produces no change in the magnitude of the Fourier transform, but does produce a change in the phase of the Fourier transform. It is also generally known that the Fourier transform of a periodic function with period T produces a Fourier transform with discrete frequency components at harmonics of the fundamental frequency, i.e., 1/T, 2/T, 3/T, etc.

Each of the generalized functions $g(i,j;t-\tau_{ij})$ may now be visualized in the frequency domain as having components at the same harmonic frequencies, the magnitudes of which depend on the construction of the tire, road surface, materials, etc.; and the phases of which depend on the location of the tread elements and footprint shape, i.e., the $\tau_{ij}$'s. This treats the problems of the sound generated by an element, and when the sound is produced independently. This is a fundamental feature of the invention which makes it useful for optimizing the location of tread elements.

The sound produced by the edge of the footprint can now be expressed as the time ensemble summation over every matrix element, or $$p(t) = \sum_{i=1}^{m} \sum_{j=1}^{n} g(i,j;t - \tau_{ij}). \quad (5)$$

Figure 2:
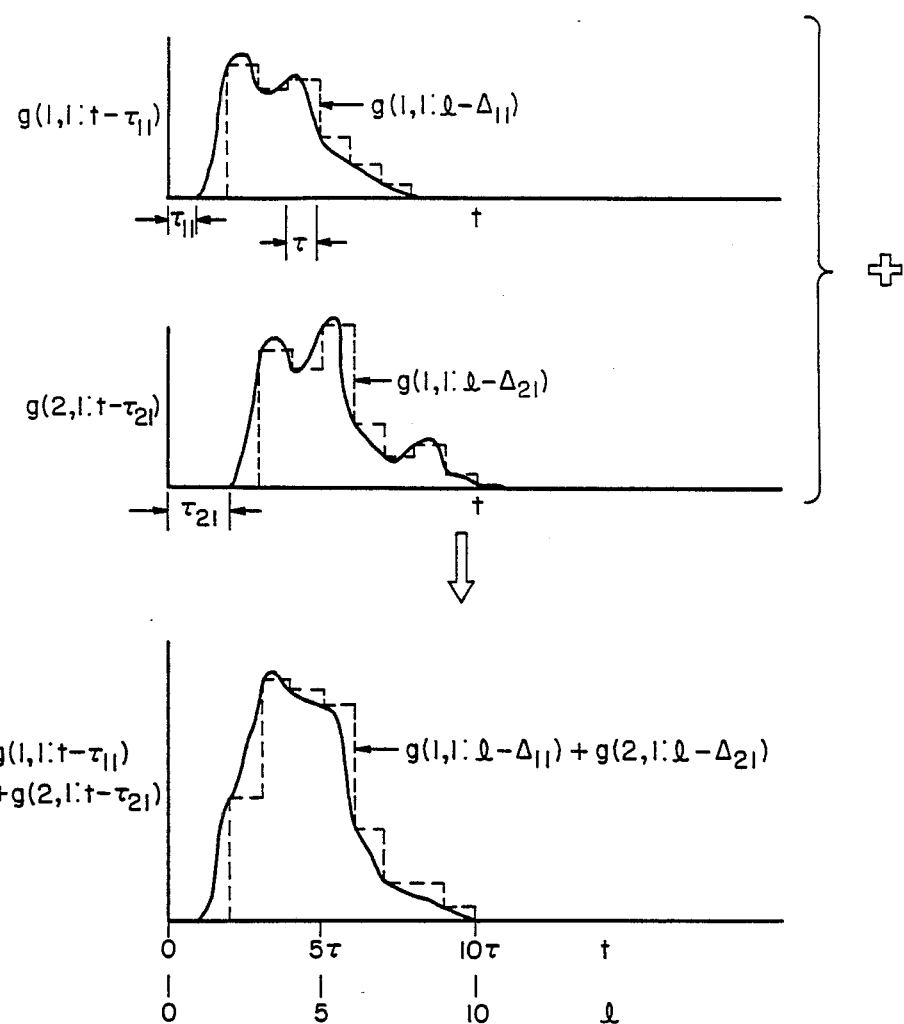
FIG. 2 is a graphical representation schematically illustrating a time ensemble summation. Equation (5) is shown as solid lines, and equation (9) is shown as dashed lines.

Referring to FIG. 2 there is shown individual representations corresponding to individual functions making their contributions as a function of time shown as the abcissa. Two elements $g(1,1;t-\tau_{11})$ and $g(2,1;t-\tau_{21})$ of the m×n elements are schematically represented, the solid line indicating the continuous function and the dashed line indicating the sampled function. The summation of the two elements is shown to produce the summmed function $g(1,1;t-\tau_{11})+g(2,1;t-\tau_{21})$. As shown, l corresponds to units of $\tau$ and at the sampling rate chosen, there is a one-to-one correspondence. It will be evident that one can change the sampling rate which will change the correspondence.

An analogy will better illustrate the meaning of equation (5). Suppose you had a group of people arranged in a formation of rows and columns. The row and column of each person could be identified as i and j respectively. Each person is assigned a unique sound, g(i,j;t). Each person will make his sound, proceeding in sequential order down each column at regular intervals. The last person in each column is followed by the first person in the same column; thus producing a periodic sound. A flashing light is used to set the interval. Each column, j, initially starts with a row i which can be different for each and every column. We call the starting row in the $j^{th}$ column $\Delta j$. The $\Delta j$'s define an arcuate profile across the columns, which translates down the columns in step with the light flashes. For example, the first group used to describe the arcuate profile of a leading edge would be; $(\Delta_1,1)$, $(\Delta_2,2)$, $(\Delta_3,3)$, .... The next group used to describe the arcuate profile of a leading edge which is set off by the next flash of the light would be; $(\Delta_1+1,1)$, $(\Delta_2+1,2)$, $(\Delta_3+1,3)$.... In FIG. 1 $\Delta_1$ and $\Delta_5$ are laterally spaced apart by 5 columns from a reference line.

It is easy to see how the sound produced will vary. The sound assigned to each person g(i,j;t) will change the character of the sound. The starting rows will change the phasing of the sound, much like the footprint shape and tread element design sequence. The rate of the blinking light will also change the waveform. For example, if the light is blinking slowly, the sounds produced by two adjacent people may not overlap, but at a faster rate the sounds will overlap and instead of producing two distinct sounds spaced apart, a combination of the two sounds is produced.

If the blinking light is now modified to include a digital counter that counts from 1 to m cyclicly, it is easy to see that the people no longer need to line up in rows and columns. They are now instructed to simply watch the counter and make their sound when the count equals their assigned value of $i-\Delta_j$ where i was their row number, and $\Delta_j$ was the starting row of their column. To modify the pattern, each person is simply assigned a new counter number of $i-\Delta_j$. There is no need to physically modify columns and rows of people. The next refinement would be to record each of the g(i,j;t)'s and build a programmable device to sequence the initiation of the g(i,j;t)'s. The ultimate refinement would be realized if the g(i,j;t)'s could be modeled and thus synthesized.

In order to perform the time ensemble summations digitally, the continuous waveform p(t) is approximated by a sampled waveform p(l), where $$l = \text{integer}\left(\frac{t}{\tau}\right) \quad (6)$$

and $\tau$ is the time interval between samples. For convenience, this discussion will assume $$\tau = \frac{T}{m}. \quad (7)$$

i.e., p(t) will be sampled m times per rotation of the tire, or once for every increment, i, of the tire rotation.

It is generally known that the Nyquist rate, as defined in; Principles of Communication Systems, Taub and Schilling, McGraw-Hill, 1971; (the disclosure of which is incorporated by reference thereto as if fully set forth herein), is twice the highest frequency component.

$$\frac{m}{T} > 2f_{max}. \quad (8)$$

The sampled waveform, as shown using dashed lines in FIG. 2, is generated from the sampled generating functions, i.e., $$p(l) = \sum_{i=1}^{m} \sum_{j=1}^{n} g(i,j;l - \Delta_{ij}) \; 1 \leq l \leq m \quad (9)$$

where $$g(i,j;l - \Delta_{ij}) = g\left(i,j;\text{integer}\left(\frac{t - \tau_{ij}}{\tau}\right)\right), \quad (10)$$

and $$\Delta_{ij} = \frac{\tau_{ij}}{\tau}. \quad (11)$$

Equation (9) may be visualized by thinking of the tire's rotation as being divided into m equal angular increments. p(l) is the sound produced as the tire rotates through the $l^{th}$ increment from the starting point so that there are m regularly spaced sequential translations of the footprint around the circumference of the tire.

If we assume that the footprint edge is invariant with the tire rotation at a given speed, then the $\Delta_{ij}$'s for each column are simplified by noting that b(1,j) will be followed by b(2,j) for the next increment of l, or more generally $$\Delta_{ij} = i - \Delta_j \quad (12)$$

where $\Delta_j$ is the number of rows that column j is offset due to the curvature of the footprint edge. It is therefore only necessary to determine the $\Delta_j$'s for each of the n columns. Note that there will be one element in each of the n columns with a given value for $\Delta_{ij}$. These n elements will all enter the footprint at the same time.

Substituting equation (12) into equation (9).

$$p(l) = \sum_{i=1}^{m} \sum_{j=1}^{n} g(i,j;l - [i - \Delta_j]). \tag{13}$$

In a typical procedure, an analysis is made of a tread assuming there is negligible deformation of the load-supporting tread elements in contact with the road surface, and the footprint of the tread design is approximated by comparison with a footprint of an actual tire constructed in a similar manner, and the tread of which tire is as close to the test tread as is available.

While the tire is mounted on a stationary vehicle, and is therefore under static load, a footprint is obtained on a sheet of white paper, with a sheet of carbon paper on top, placed under the tire mounted on the vehicle, to give a clear imprint upon contact with the paper. It will be recognized that the footprint under a dynamic load, will be different, further varying as the speed of the vehicle, inflation pressure, and the load it carries, are varied.

Only enough of the pattern of the tread (to be tested) is required, as will provide an approximation of what would be the actual footprint of the tread, should a tire with that tread design actually be built. With this estimate of the footprint, an equation is written to fit the arcuate profile of either a leading or trailing edge of the footprint.

By actual measurements from the footprints under varying static loads, and inflation pressures, we measure different $\Delta_j$'s, and input these to obtain an approximation of noise under operating loads. This provides a subjective evaluation of the noise in the normal operating range from essentially no load to fully loaded. This in turn provides information as to the sensitivity of the tread pattern design to changes in footprint. The ideal is to design a tread with minimal sensitivity within the range.

Figure 3:
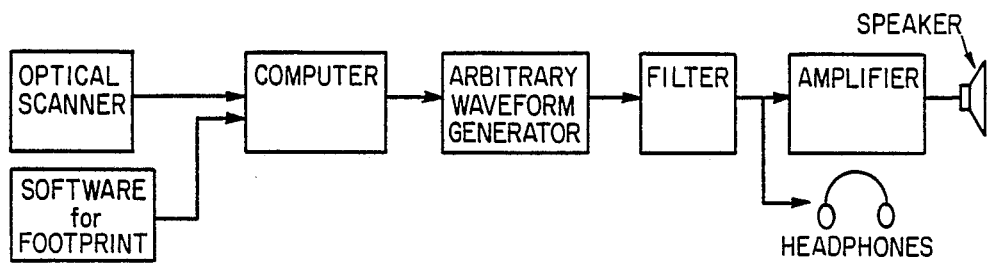
FIG. 3 is a block diagram schematically illustrating the components of the system.

Equation (13) generates m samples of the sound waveform. The sampled waveform may then be filtered in the Fourier domain to simulate the car sound transmission function, or to select or reject a frequency band of interest. The m samples are then loaded into an arbitrary waveform generator such as Qua Tech WSB-10 or Waveteck model 75 which converts the digital sampled waveform into a periodic analog signal with the same period, T. The signal is then amplified, and played over loudspeakers or headphones for subjective evaluation as illustrated in FIG. 3.

A fluid displacement model has been tested which considers the tread to be displacing a fluid at the road surface. This model produces a sound pressure proportional to the rate at which the volume of air is being displaced by the tread matrix. In this model, each element of the binary tread matrix acts like a small piston pushing out a volume of air at a constant rate for a time T/m, coincident with entry into the footprint. In this case, each $g(i,j;l-\Delta_{ij})$ function produces a nonzero component for only one value of l, i.e., there is no ringing or transient sound produced after the matrix element enters the footprint interior. In this case, S can be defined as an operation which generates the values for the $g(i,j;l-\Delta_{ij})$'s by $$g(i,j;l - \Delta_{ij}) = \begin{cases} b(i,j) & l = \Delta_{ij} \\ 0 & l \neq \Delta_{ij} \end{cases} \tag{14}$$

Recall that
$\Delta_{ij} = i - \Delta_j.$

Therefore, the only nonzero $g(i,j;l-\Delta_{ij})$'s will be when $$l = i - \Delta_j \tag{15}$$

or $$i = l + \Delta_j. \tag{16}$$

In this case, $$\sum_{i=1}^{n} g(i,j;l - \Delta_{ij}) = b(l + \Delta_j, j). \tag{17}$$

Substituting Equation (17) into Equation (9), $$p(l) = \sum_{j=1}^{n} b(l + \Delta_j, j). \quad 1 \leq l \leq m \tag{18}$$

Equation (18) represents the sound produced by the front edge of the footprint only. The contribution due to the rear edge would be a vacuum effect, producing a 180° phase shift in the waveform with a time delay of $\Delta_j'$. The combined results would be $$p(l) = \sum_{j=1}^{n} b(l + \Delta_j, j) - b(l + \Delta_j', j). \tag{19}$$

It should be noted that in general $$\Delta_j' \neq \Delta_j + \text{constant}. \tag{20}$$

This means that the sound components produced by the front and rear edges may be different.

While this model is a first order approximation, it does preserve the salient characteristic of the phase relationship of the Fourier components; which are known to be responsible for much of the intelligibility of audio signals.

Three commercially available B F Goodrich passenger tires; (a) P597 XLM P205/75R14, (b) P845 RADIAL T/A P235/60R15, and (c) P784E XLM H/T P195/75R14 were rated for subjective noise ratings. The test was conducted by a trained jury, using a especially maintained 1984 Chevrolet Caprice on a smooth asphalt highway. They were ranked from best to worst as follows: (a), (b), and (c) there being a minimum significant difference between (a) and (b), and a slightly greater difference (about 15%) between (b) and (c). By minimum significant difference we refer to a rating unit which a person can repetitively and reliably distinguish from one test to the next.

The same tires were also evaluated by our method using the fluid displacement model for a single footprint edge, as described by Equation (18) by several judges, each making a separate and individual evaluation. The equipment used was: an IBM PC/AT with a Qua Tech WSB-10 arbitrary waveform generator board, an analog filter to simulate the loss of sound transmission due to the body of the car (transmission insertion loss), an audio amplifier, and speakers. They were ranked by our simmulated test from best to worst in precisely the same order as in the actual road test. Thus, the evaluations made by actual testing were confirmed, and the small differences distinguishing one tire from the next were corroborated.

What is claimed is:

1. A method for evaluating the level of objectionable noise associated with the operation of a tire by virtue of its tread contacting a road surface, comprising,
    (a) digitizing the tread design on a coordinate system so as to define load-supporting portions of the tread in contact with the pavement, and distinguish them in binary form from those portions of the tread which are not in contact, as multiple matrix elements;
    (b) defining a generally arcuate profile of a leading or trailing edge of a footprint of the tread by fitting an equation to the edge;
    (c) sequentially performing a time ensemble summation, of the noise produced by each matrix element, over every matrix element on the entire circumferential surface;
    (d) converting the sequence of summations to a periodic analog signal;
    (e) converting the analog to a sound; and,
    (f) aurally evaluating the sound.

2. The method of claim 1 wherein step (e) includes correlating the sound generated by individual matrix elements consisting essentially of said load supporting portions and grooves, and using a sampling rate which is at least the Nyquist rate.

3. The method of claim 2 wherein step (c) includes sequentially summing 0's and 1's along at least one footprint edge for regularly spaced sequential translations of the footprint around the circumference of the tire.

4. A system for evaluating the level of objectionable noise associated with the operation of a tire by virtue of its tread contacting a road surface, comprising,
    (a) means to digitize the tread design on a coordinate system so as to define load-supporting portions of the tread in contact with the pavement, and distinguish them in binary form from those portions of the tread which are not in contact;
    (b) imprinting means to define the imprint of a footprint so as to approximate a generally arcuate profile of a leading or trailing edge of a footprint of the tread;
    (c) computer means to sequentially perform a time ensemble summation, of the noise produced by each matrix element, over every matrix element on the entire circumferential surface;
    (d) means to convert the sequence of summations to a periodic analog signal; and,
    (e) means to convert the analog signal to an audible sound for evaluation of the tire noise level.

5. The system of claim 4 wherein said means to convert said sequence of summations to a periodic analog signal is an arbitrary waveform generator.

6. The system of claim 5 wherein said computer means sums 0's and 1's along at least one footprint edge for regularly spaced sequential translations of the footprint around the circumference of the tire.

* * * * *

UNITED STATES PATENT AND TRADEMARK OFFICE
CERTIFICATE OF CORRECTION

PATENT NO. : 4,727,501
DATED : February 23, 1988
INVENTOR(S) : David H. Parker, David G. Caruso, Donald B. Thrasher, Robert J. Blinn It is certified that error appears in the above—identified patent and that said Letters Patent is hereby corrected as shown below:

IN COLUMN 9, LINE 22, AFTER THE WORD ANALOG, ADD -- SIGNAL --;
LINE 24, "(e)" SHOULD READ -- (c) --.

Signed and Sealed this

Sixth Day of December, 1988

Attest:

DONALD J. QUIGG

Attesting Officer     Commissioner of Patents and Trademarks